(12) United States Patent
Hamilton

(10) Patent No.: US 7,698,227 B1
(45) Date of Patent: Apr. 13, 2010

(54) SYSTEM AND METHOD FOR PROVIDING TRACEABLE ACKNOWLEDGEMENT OF A DIGITAL DATA DISTRIBUTION LICENSE

(75) Inventor: Graham Hamilton, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1067 days.

(21) Appl. No.: 11/182,277

(22) Filed: Jul. 14, 2005

(51) Int. Cl.
G06F 17/60 (2006.01)
H04N 7/16 (2006.01)
H04L 9/00 (2006.01)

(52) U.S. Cl. .............................. 705/59; 705/51; 705/52; 726/27

(58) Field of Classification Search .................. None
See application file for complete search history.

(56) References Cited

U.S. PATENT DOCUMENTS

| | | | | |
|---|---|---|---|---|
| 5,475,753 A * | 12/1995 | Barbara et al. | ............ | 713/187 |
| 5,490,216 A * | 2/1996 | Richardson, III | ............ | 705/59 |
| 5,638,443 A * | 6/1997 | Stefik et al. | ............ | 705/54 |
| 5,724,425 A * | 3/1998 | Chang et al. | ............ | 705/52 |
| 5,812,072 A * | 9/1998 | Masters | ............ | 341/55 |
| 5,910,987 A * | 6/1999 | Ginter et al. | ............ | 705/52 |
| 6,263,313 B1 * | 7/2001 | Milsted et al. | ............ | 705/1 |
| 6,389,538 B1 * | 5/2002 | Gruse et al. | ............ | 713/194 |
| 7,076,059 B1 * | 7/2006 | Kiszely | ............ | 380/29 |
| 2004/0003268 A1 * | 1/2004 | Bourne et al. | ............ | 713/193 |
| 2004/0088674 A1 * | 5/2004 | Kato et al. | ............ | 716/18 |
| 2006/0123239 A1 * | 6/2006 | Martinian et al. | ............ | 713/186 |

* cited by examiner

Primary Examiner—Andrew J. Fischer
Assistant Examiner—C. Aaron McIntyre
(74) Attorney, Agent, or Firm—Park, Vaughan & Fleming LLP

(57) ABSTRACT

A system and method for providing traceable acknowledgement of a digital data distribution license is presented. A license specifying terms applicable to a user requesting a distribution of data maintained in digital form is defined. The digital data distribution is encoded by application of a phrase used to convolute the digital data distribution. The phrase signifies an acknowledgement by the user to be bound by the license terms. The digital data is distributed. Access to the digital data distribution requires application of the phrase to deconvolute the digital data distribution.

14 Claims, 6 Drawing Sheets

Fig. 4.
40
Original (41)  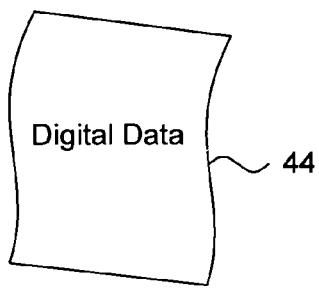
Digital Data — 44
"I accept the license." Phrase (47)
Convoluted (42) 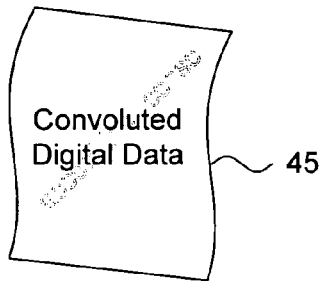
Convoluted Digital Data — 45
Crypto key (48)
Encrypted (43) 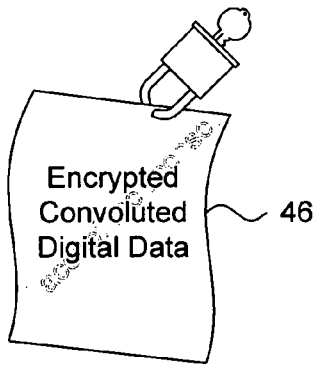
Encrypted Convoluted Digital Data — 46

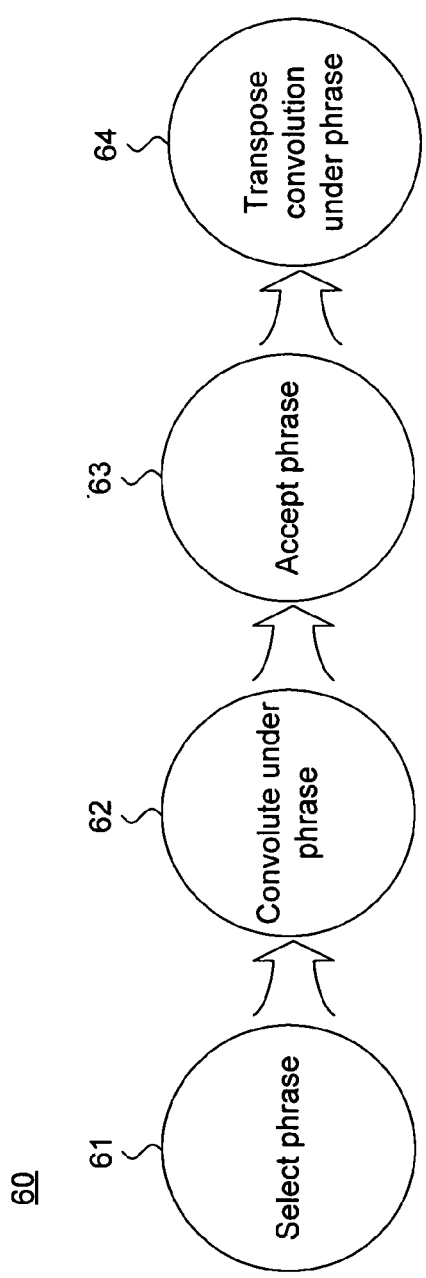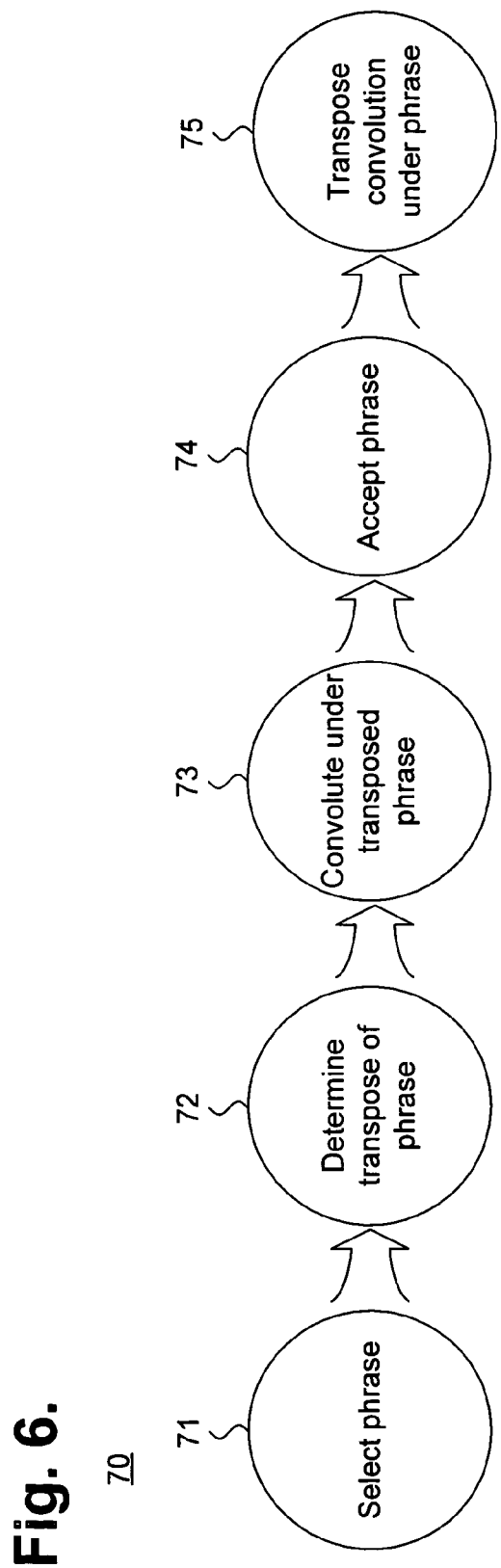

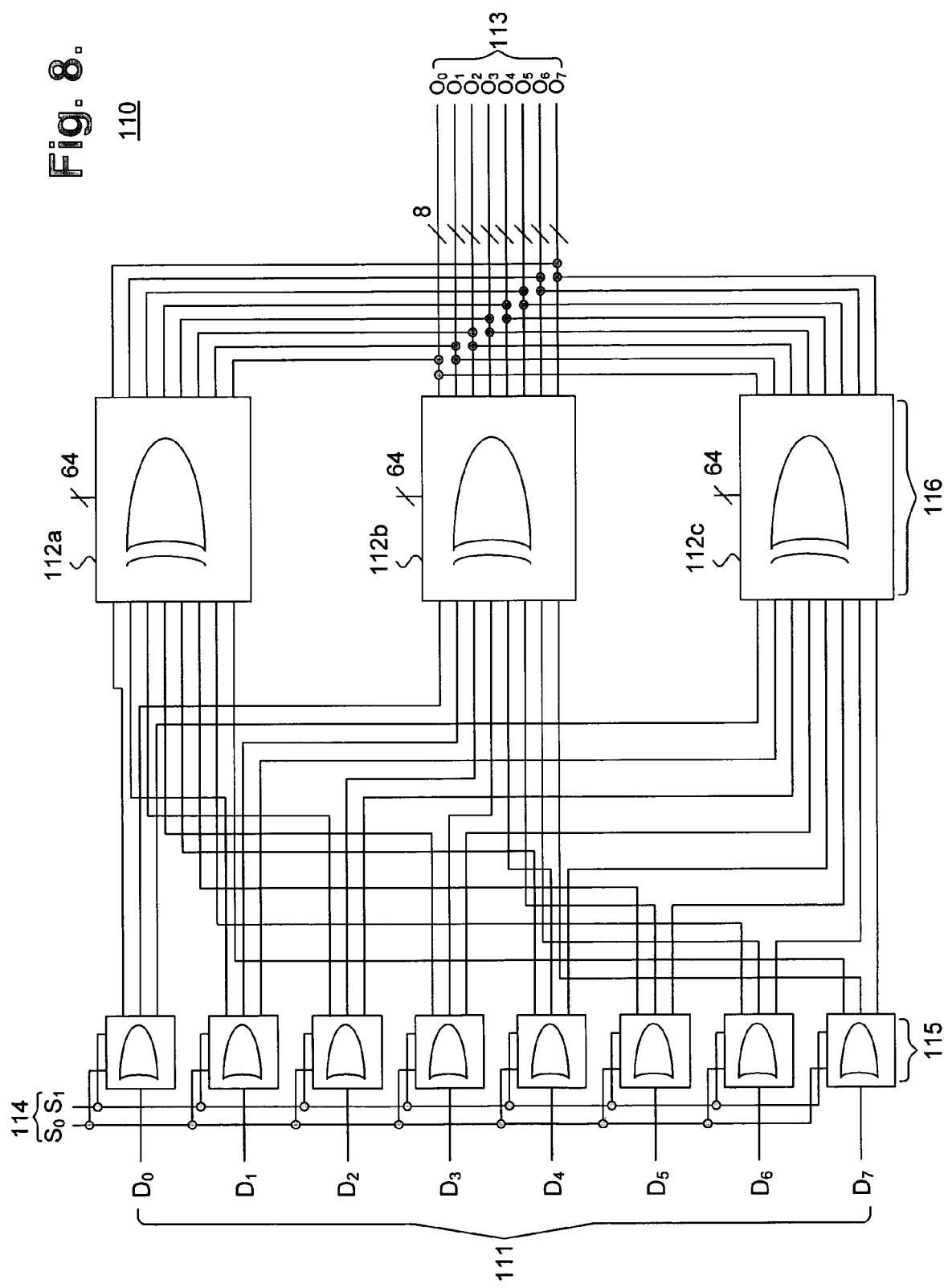

SYSTEM AND METHOD FOR PROVIDING TRACEABLE ACKNOWLEDGEMENT OF A DIGITAL DATA DISTRIBUTION LICENSE

FIELD OF THE INVENTION

The invention relates in general to digital data distribution licensing and, in particular, to a system and method for providing traceable acknowledgement of a digital data distribution license.

BACKGROUND OF THE INVENTION

Generally, digital data is distributed subject to a license or similar written agreement, regarding use, modification, and redistribution. Distribution is conditioned upon the acceptance of the license terms, which requires an express acknowledgement to be bound. Licenses protect the licensor and can permit legal recourse in the event of a breach of license terms. Acknowledgment is critical to ensuring the availability of license protections. Source code, for instance, is frequently proprietary and represents significant outlays of time, money and effort. Likewise, software publishers risk losing significant potential revenue or royalties due to illicit copying. Licenses help to safeguard such interests.

Digital data is commonly distributed on-line and on physical media. Web-based on-line digital data distribution is frequently provided with a "click through" prompt that must be toggled to signify acceptance of license terms. Physical media digital data distribution requires opening an envelope or breaking a "shrink wrap" seal to signify acceptance.

Both Web-based and physical media acceptance confirm license acknowledgment through user action, that is, a click-through or opening of physical media. However, these steps can be bypassed to avoid license acknowledgement. Illicit online copies, for instance, can be redistributed following download without requiring subsequent users to acknowledge the license and be bound. Similarly, bootlegged copies of physical media can be disseminated without reference to the license. In both situations, recipients of illicit copies need not acknowledge agreement to be bound to the license and the licensor is left with limited legal and practical recourse.

To help combat unlicensed distribution and use, digital data distributions can include an installer application. A user executes the installer application, which conditions installation upon acceptance of the license terms. Although providing an additional layer of assurance, determined scofflaws can still compromise these applications to skip license acceptance.

Cryptographic keys can also be used to help combat unlicensed distribution and use. The licensor maintains a key distribution mechanism to issue cryptographic keys to authorized users and a licensee enters the cryptographic key to acknowledge the license. Key distribution mechanisms, though, involve significant maintenance costs and can create additional complexity for users, who generally must reenter a cryptographic key if the digital data is reinstalled. Tracking cryptographic keys can be especially problematic for a licensee with numerous licenses or for whom significant time has passed since original installation. Cryptographic keys can also be compromised through illicit key copies.

Despite the foregoing efforts, license acknowledgement remains an act separate from the digital data and a determined user can avoid accepting license terms by circumventing the mechanism employed.

Therefore, there is a need for providing a mechanism to ensure acceptance of a digital data distribution license that is intrinsic to the actual digital data. Such an approach would preferably be providable as part of layered security to confirm express acknowledgement as a condition of use.

SUMMARY OF THE INVENTION

Digital data, such as source code, is provided in an encoded form. Decoding requires the entry of a phrase that independently signifies license acknowledgement. In one embodiment, the phrase, "I accept the license," or words to that effect, is used to convolute the digital data by applying, for instance, a logical exclusive OR (XOR). Decoding requires a transpose operation by reapplying the phrase through the logical XOR. In the further embodiment, the convolution is part of a layered security scheme.

One embodiment provides a system and method for providing traceable acknowledgement of a digital data distribution license. A license specifying terms applicable to a user requesting a distribution of data maintained in digital form is defined. The digital data distribution is encoded by application of a phrase used to convolute the digital data distribution. The phrase signifies an acknowledgement by the user to be bound by the license terms. The digital data is distributed. Access to the digital data distribution requires application of the phrase to deconvolute the digital data distribution.

Tying the decoding of encrypted digital data with a phrase signifying license acknowledgement renders attempts to bypass a conventional license acknowledgment mechanisms harmless. Acknowledgement must explicitly be provided through entry of the phrase required to decode the digital data, thereby providing express acceptance of license terms.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

BRIEF DESCRIPTION OF THE DRAWINGS

FIG. 4 is a process flow diagram showing layering of the process of FIG. 3 within security provisioning.

FIG. 5 is a process flow diagram showing symmetric encoding and decoding through the process of FIG. 3.

FIG. 6 is a process flow diagram showing asymmetric encoding and decoding through the process of FIG. 3.

FIG. 8 is a functional schematic diagram showing a circuit for providing traceable acknowledgement of a digital data distribution license, in accordance with a further embodiment.

DETAILED DESCRIPTION

Digital Data Distribution Environment

Figure 1:
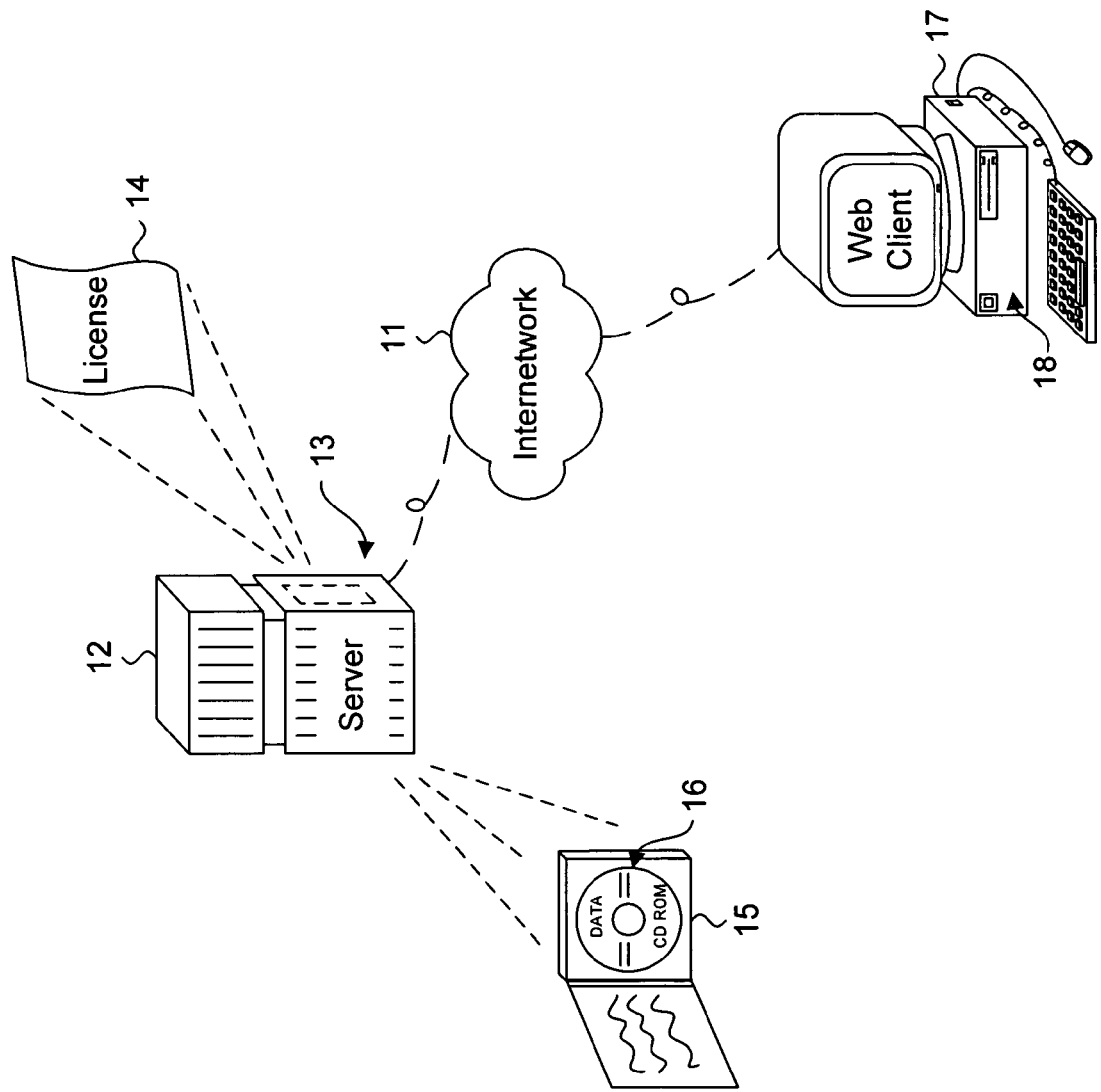
FIG. 1 is a block diagram showing a digital data distribution environment.

Digital data includes both executable programs and stored data, such as source code, fixed in a tangible medium that can be shared electronically. FIG. 1 is a block diagram showing a digital data distribution environment 10. By way of example, digital data 13 is maintained on a server 12 that is accessible by other computers through an internetwork 11, such as the Internet. Through the server 11, online users can request distribution of the digital data 13 using a Web browser executing on a Web client 17 interconnected to the internetwork 11. Other network topologies and arrangements are possible, including local area and wide area networks physically implemented using wired and wireless media.

In one embodiment, the digital data 13 can be distributed online through a Web client 17 or on physical media 15. A request for an online download of the digital data 13 is sent via the Web browser to the server 12, which can identify the Web client 17 and download the digital data. A request for a physical media distribution 15 of the digital data 13 is sent to the server 13 through various conventional means, such as an online request, telephone call, and so forth. The downloaded digital data 18 received by the Web client 17 and the stored digital data 16 contained on the physical media distribution 15 are provided in a convoluted form, as further described below with reference to FIG. 3. A physical media distribution 15 can be provided as a data CD ROM, DVD, tape, ROM, or other form of non-volatile and transportable storage medium. Digital data 13 includes binary data, assembly code, object code, intermediate code, source code, structured data, and unstructured data. Other forms of digital data are possible. Additionally, the digital data 13 could be maintained on a system separate from the server 12 and other types of servers, such as a File Transfer Protocol (FTP) or Network News Transport Protocol (NNTP) server, could be used either in addition to or in lieu of the server 12. Finally, the digital data 13 could be provided through the file system of a client computer, such as Web client 17. Other platforms and configurations for storing or distributing the digital data 13 are possible.

Once received, the use of the digital data 13 is conditioned upon an acknowledgement to be bound by the terms of a license 14. The license 14 specifies the terms and conditions that can be legally binding upon the user as a licensee of the digital data 13 and can provide the licensor with legal recourse in the event of breach. Licenses enable a licensor to maintain control over the quality and substance of the digital data 13 and to protect the generation of revenue or royalty streams. Licenses also protect certain legal rights, such as the reservation of copyright, patent and other intellectual property rights and proprietary interests, and can help ensure compliance with export laws. Although described here with reference to a license, other types of agreements, particularly where express acknowledgement is required to bind a user, are also applicable.

In one embodiment, the server 11 and Web client 17 are general purpose, programmed digital computing devices that are capable of multi-threaded execution and which include a central processing unit (CPU), random access memory, non-volatile secondary storage, such as a hard drive or CD ROM drive, interfaces to a wired or wireless network, and various peripheral devices, including user interfacing means, such as a keyboard and display. Program code, including software programs, and data is loaded into the memory for execution and processing by the CPU and results are generated for display, output, transmittal, or storage.

Conventional Approaches to Digital Data Distribution

Figure 2:
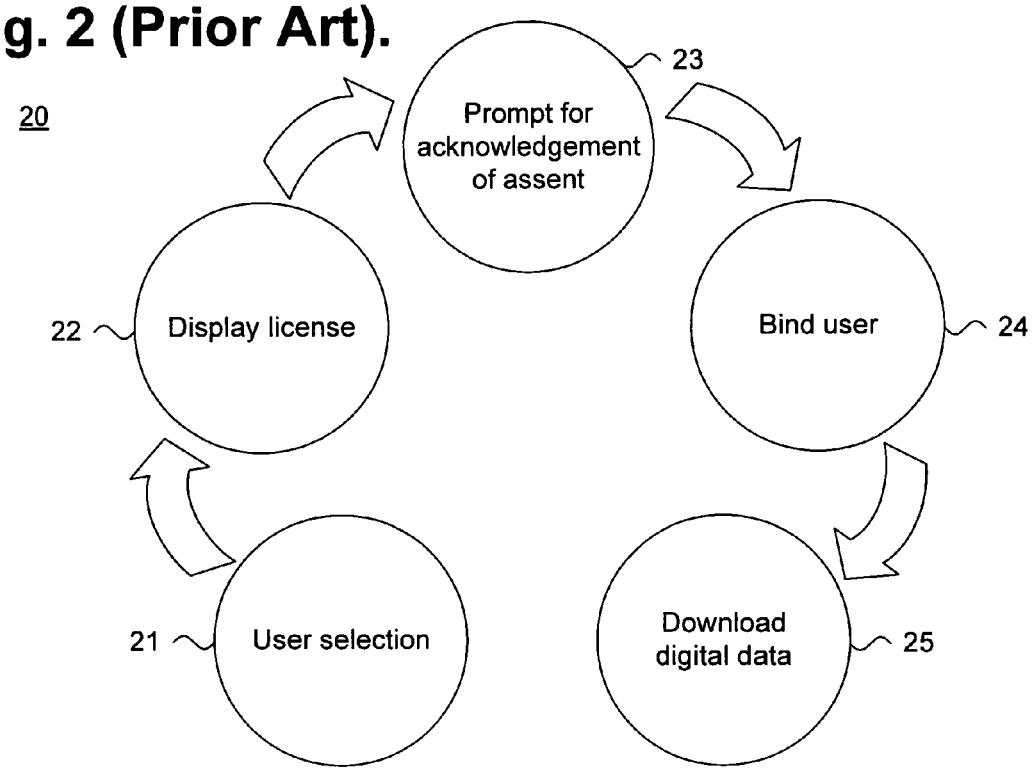
FIG. 2 is a process flow diagram showing, by way of example, a prior art digital data distribution through a Web server.

Conventional approaches to ensuring that users acknowledge to be bound by the terms of a license applicable to a digital data distribution is generally provided through a mechanism that is separate from the actual digital data being licensed. FIG. 2 is a process flow diagram showing, by way of example, a prior art digital data distribution 20 through a Web server. Although described with reference to a Web server, the digital data distribution can also be provided through other forms of servers, such as an FTP and NNTP server, through peer-to-peer file sharing, and using conventional file systems.

Initially, a user makes a selection of digital data 13 to be downloaded from a server 12 (operation 21), such as through a Web browser executing on a Web client 17. Upon identifying and retrieving the requested digital data for download, the server 12 generates a display of the license through, for instance, a dialog box or screen display (operation 22). The server 12 prompts the user for assent to the terms of the license by presenting a user-selectable toggle, often a virtual "button" labeled with the term, "Accept," or words to that effect (operation 23). The prompt is accepted by clicking the virtual button to acknowledge being bound by the license terms (operation 24), after which the server 12 downloads the digital data 13 (operation 25).

The "click-through" toggle provides the necessary acknowledgement of license acceptance. However, the acknowledgment operation could be bypassed in a poorly implemented Website and thereby allow the digital data 13 to be distributed without binding the user to the license terms. Similar prior art approaches that utilize encryption and various forms of password protection are equally susceptible to compromise, as the mechanisms remain separate from the digital data 13 being licensed.

Tracing Digital Data Distribution License Acknowledgement

Figure 3:
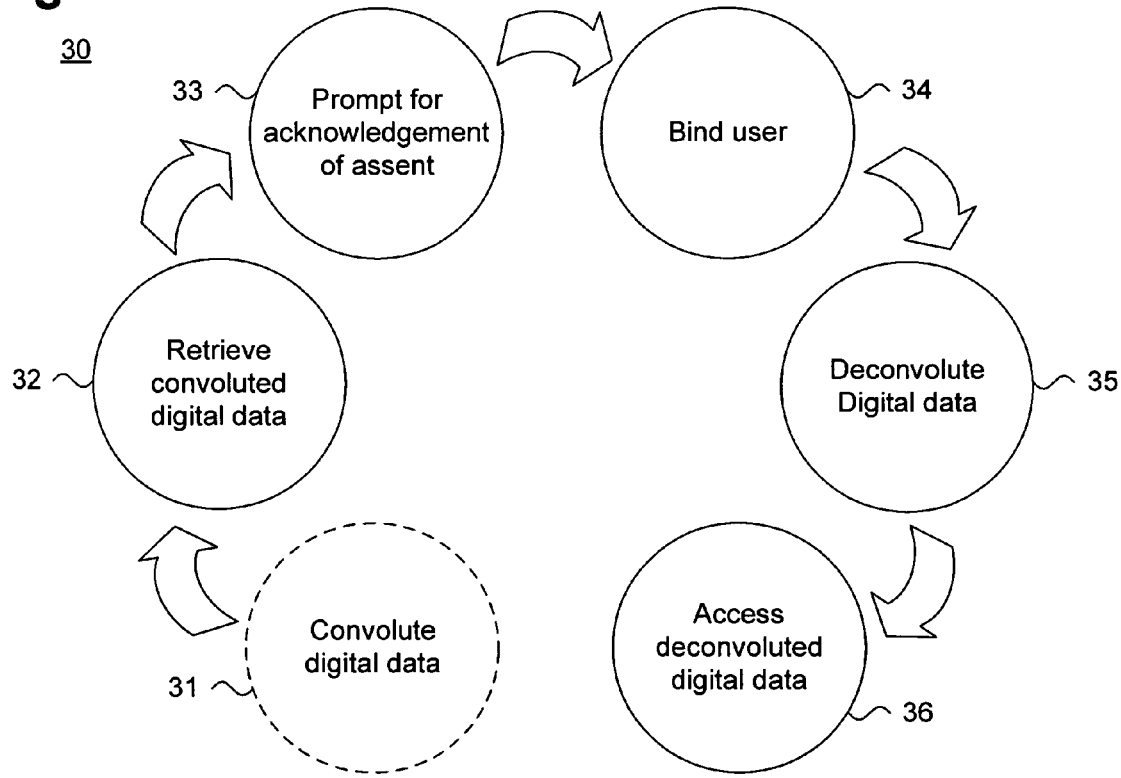
FIG. 3 is a process flow diagram for tracing acknowledgement of a digital data distribution license, in accordance with the invention.

Bypassing of the acknowledgment operation can be avoided by integrating the physical actions constituting assent with the actual digital data 13. FIG. 3 is a process flow diagram for tracing acknowledgement 30 of a digital data distribution license, in accordance with the invention. Acknowledgement is integrated by encoding the digital data 13 using a convolution scheme that requires entry of a phrase signifying acknowledgement of the license as an essential part of the decoding of the digital data. In one embodiment, application of the phrase transforms the convoluted digital data into a useful form for access by the user. Access includes reading, modifying, executing, compiling, assembling, parsing, loading, linking, analyzing, decompressing, decoding, downloading, and uploading of the digital data distribution. Other forms of access are possible.

Initially, the digital data 13 is convoluted (operation 31). The digital data 13 can be convoluted either prior to or upon demand by a user. In one embodiment, the same operation is used for convoluting and deconvoluting, as further described below with reference to FIG. 5. In a further embodiment, a transpose of the operation for convoluting the digital data 13 is used for deconvoluting, as further described below with reference to FIG. 6. The convoluted digital data is retrieved by the user through a Web client 17, or on a storage medium 15 (operation 32). Retrieval of the convoluted digital data can be through a conventional digital data distribution Website, such as described above with reference to FIG. 2, or through direct retrieval without first requiring express acknowledgement of the license.

Upon accessing the convoluted digital data, the user is prompted to acknowledge the license terms, preferably after reviewing a displayed view of the license (operation 33). The prompt could be generated, for instance, by an installer application. The user must enter a phrase, such as "I accept license," or words to that effect, to acknowledge the license terms and be bound (operation 34). The convoluted digital data is deconvoluted by applying the phrase (block 35), after which the user is permitted access to the deconvoluted digital data (operation 36).

The digital data 13 is encoded using a methodology that requires entry of a phrase signifying acknowledgement, such as "I accept the license," or words to that effect, to deconvolute the convoluted digital data. If acknowledgment is provided through a front-end application, such as an installer application, the phrase can be transparently submitted to deconvolute the digital data. However, if the installer application is surreptitiously bypassed, the digital data remains convoluted until, and if, the user submits the phrase under the correct operation to deconvolute the convoluted digital data.

Layering within Security Provisioning

Convolution can be provided as part of a comprehensive security scheme. FIG. 4 is a process flow diagram showing layering 40 of the process 30 of FIG. 3 within security provisioning. For instance, digital data convolution can be combined with encryption. Digital data 44 in an original state 41 is transformed into convoluted digital data 45 in a convoluted state 42 by applying a phrase, such as, "I accept the license," or words to that effect. The convoluted digital data 45 is transformed into encrypted convoluted digital data 46 in an encrypted state 43 by encrypting with a cryptographic key 48. The encrypted convoluted digital data 46 is recovered by applying the transpose operations of decryption and deconvolution to restore the digital data back to original form. Other security layerings are possible.

Symmetric Encoding and Decoding

Symmetric encoding and decoding through convolution apply the same phrase using the same operation. FIG. 5 is a process flow diagram showing symmetric encoding and decoding 60 through the process 30 of FIG. 3. Initially, a phrase, such as, "I accept the license," or words to that effect, is selected to acknowledge the license (operation 61). The digital data 13 is then convoluted under the phrase by applying an operation (operation 62), such as a logical exclusive OR (XOR). To reverse the encoding, the same phrase is accepted, such as through an installer application (operation 63), and the convolution is transposed under the phrase by applying the same operation (operation 64), such as the logical XOR, to recover the original digital data 13. Other operations are possible.

Asymmetric Encoding and Decoding

Asymmetric encoding and decoding through convolution apply different operations under a transposed phrase that requires application of a phrase such as, "I accept the license," or words to that effect, to deconvolute the digital data. FIG. 6 is a process flow diagram showing asymmetric encoding and decoding 70 through the process 30 of FIG. 3. Initially, a phrase or key for deconvolution is selected (operation 71) and the transpose of the phrase is determined for convoluting the digital data 13 (operation 72). The digital data 13 is then convoluted under the transposed phrase (operation 73). To decode the digital data 13, the phrase is accepted, such as through an installation application (operation 74), and the convolution is transposed under the phrase by applying an operation to recover the original digital data 13 (operation 75). Other operations are possible.

System

Figure 7:
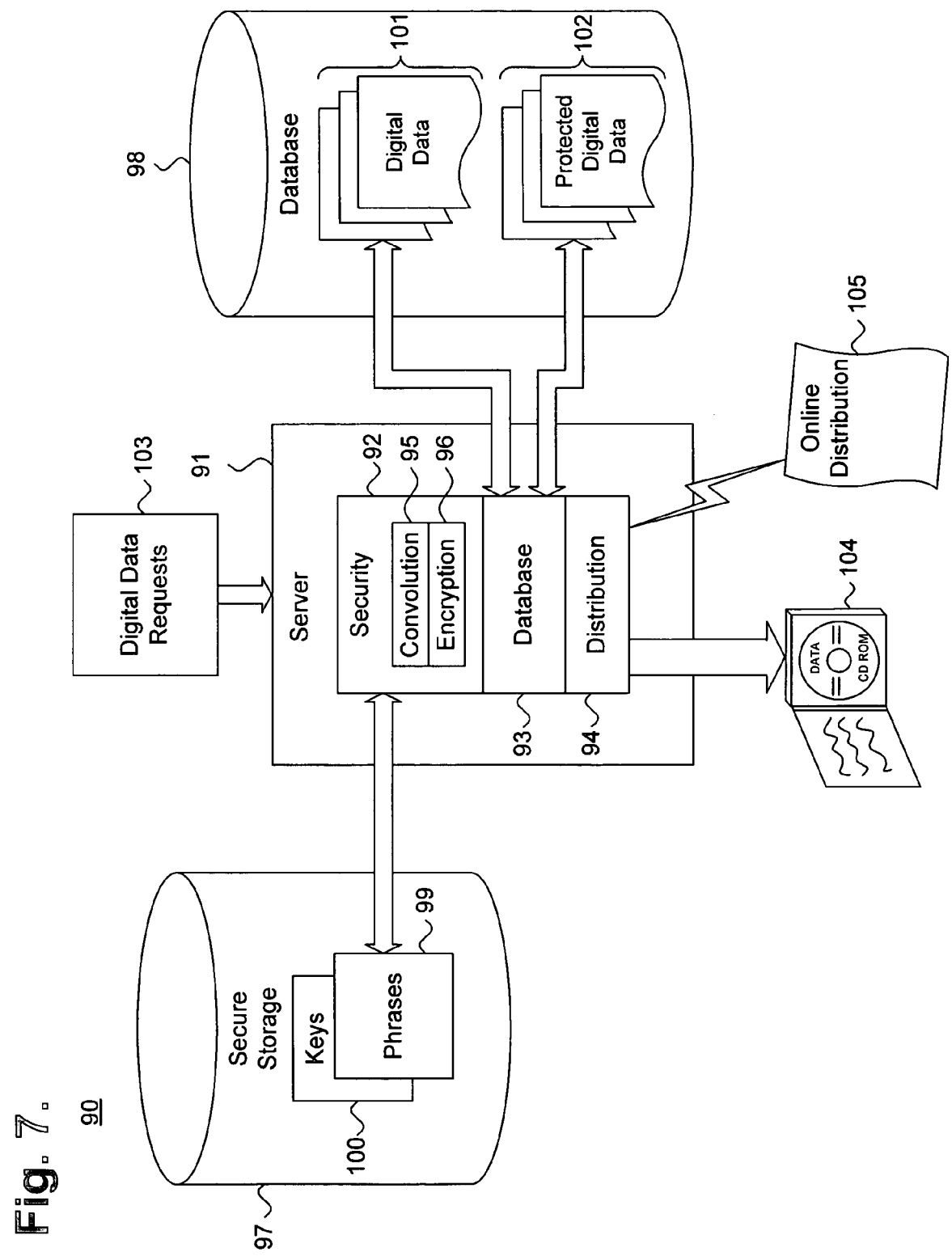
FIG. 7 is a block diagram showing a system for providing traceable acknowledgement of a digital data distribution license, in accordance with one embodiment.

The digital data 13 can be convoluted and distributed centrally by a server accepting requests for distribution. FIG. 7 is a block diagram showing a system 91 for providing traceable acknowledgement of a digital data distribution license 14, in accordance with one embodiment. The server 91 executes a sequence of programmed process steps, such as described above with reference to FIG. 3, implemented, for instance, on a programmed digital computer system.

The server 91 includes a security module 92, database module 93, and distribution module 94. The security module 92 convolutes digital data 101 maintained in a database 98 through a convolution submodule 95. In a further embodiment, the security module 92 provides layered security by applying encryption through an encryption submodule 96 to convoluted digital data. The digital data 101 is maintained in the database 98 managed by the database module 93. The server 91 includes a secure storage device 97 storing a set of phrases for convolution 99 and, in a further embodiment, cryptographic keys 100. Following convolution and, in a further embodiment, encryption, the digital data 101 is stored as protected digital data 102 in the database 98.

Subsequently, the server 91 accepts digital data requests 103 through the distribution module 94, which validates users and provides the protected digital data 102 stored on a physical media distribution 104 or online distribution 105. Other modules and server functionality are possible.

Circuit for Providing Traceable Acknowledgement

In one embodiment, the same operation is applied under a phrase, such as, "I accept the license," or words to that effect, to signify license acknowledgement using the same operation, such as an XOR operation. FIG. 8 is a functional schematic diagram showing a circuit 110 for providing traceable acknowledgement of a digital data distribution license 14, in accordance with a further embodiment. By way of example, the phrase is divided into three eight-byte phrase segments 112a-c, with null padding to fill any unused bits. For instance, the phrase, "I accept the license," could be divided into the eight-byte segments, "I accept," "the li," and "cense." The eight-byte phrase segments 112a-c are fed as inputs into a set of three XOR gates 116, which also receive as inputs the digital data 13 in one-byte segments 111. The one-byte segments 111 are fed into OR gates 115, which are switched through control signals 114 to select the proper ordering of the eight-byte phrase segments 112a-c to apply. The digital data 13 is convoluted under the phrase and is output in sequential eight-byte segments 113. To deconvolute the digital data, the same phrase would have to be applied through an XOR operation with the same null padding to regenerate the original digital data 13.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing traceable acknowledgement of a digital data distribution license, comprising:
   a license defined to specify terms applicable to a user requesting a distribution of data maintained in digital form;
   a security circuit that encodes the digital data by application of a phrase used to convolute the digital data, wherein the phrase signifies an acknowledgement by the user to be bound by the license terms;

a convolution subcircuit in the security circuit configured to convolute the digital data by:
  dividing the phrase into two or more sub-phrases; and
  performing an XOR operation wherein each of the sub-phrases from the two or more sub-phrases is XORed with at least one corresponding separate portion of the digital data; and
a distribution circuit that distributes the digital data, wherein the distribution circuit is configured to apply the phrase to deconvolute the digital data into a useful form, and wherein applying the phrase to deconvolute the digital data binds the license terms to the user.

2. A system according to claim 1, wherein the digital data is decoded by accepting entry of the phrase by the user.

3. A system according to claim 1, wherein the convolution subcircuit is further configured to perform a transpose operation on the convoluted digital data.

4. A system according to claim 1, providing the encoding of the digital data within a layered security scheme further comprising encrypting the digital data under a cryptographic key.

5. A system according to claim 1, wherein the access comprises at least one of reading, modifying, executing, compiling, assembling, parsing, loading, linking, analyzing, decompressing, decoding, downloading, and uploading of the digital data.

6. A system according to claim 1, wherein the digital data comprises at least one of binary data, assembly code, object code, intermediate code, source code, structured data, and unstructured data.

7. A method for providing traceable acknowledgement of a digital data distribution license, comprising:
  defining a license specifying terms applicable to a user requesting a distribution of data maintained in digital form;
  encoding the digital data, wherein encoding the digital data involves convoluting the digital data using a phrase, wherein the phrase signifies an acknowledgement by the user to be bound by the license terms, and wherein convoluting the digital data involves dividing the phrase into two or more sub-phrases and performing an XOR operation wherein each sub-phrase from the two or more sub-phrases is XORed with at least one corresponding separate portion of the digital data; and
  distributing the digital data;
  accessing the distributed digital data, wherein accessing the digital data involves using the phrase to deconvolute the digital data into a useful form, and wherein using the phrase to deconvolute the digital data binds the license terms to the user.

8. A method according to claim 7, further comprising:
  decoding the digital data by accepting entry of the phrase by the user.

9. A method according to claim 7, wherein the encoding further comprises:
  performing a transpose operation on the convoluted digital data.

10. A method according to claim 7, further comprising:
  providing the encoding of the digital data within a layered security scheme further comprising encrypting the digital data under a cryptographic key.

11. A method according to claim 7, wherein the access comprises at least one of reading, modifying, executing, compiling, assembling, parsing, loading, linking, analyzing, decompressing, decoding, downloading, and uploading of the digital data.

12. A method according to claim 7, wherein the digital data comprises at least one of binary data, assembly code, object code, intermediate code, source code, structured data, and unstructured data.

13. A computer-readable storage medium holding code for performing the method according to claim 7.

14. A circuit for providing traceable acknowledgement of a digital data distribution license, comprising:
  a gate structure to encode the digital data by application of a phrase used to convolute the digital data, wherein the phrase signifies an acknowledgement by a user to be bound by license terms specifying terms applicable to a user requesting a distribution of data maintained in digital form, wherein access to the digital data requires application of the phrase to deconvolute the digital data into a useful form, and wherein applying the phrase to deconvolute the digital data binds the license terms to the user, wherein the gate structure includes:
    a set of N OR subcircuits, each OR subcircuit having a data input a control input and M selected data outputs, wherein the data inputs are coupled to input data signals and the control inputs are coupled to a select signal, and wherein the OR subcircuits are configured so that a separate portion of the digital data is received by each of the OR subcircuits on a corresponding input data signal;
    a set of M XOR subcircuits, each XOR subcircuit having N selected data inputs a phrase input and N convoluted data outputs wherein the selected data inputs for the XOR subcircuits are coupled to corresponding selected data outputs of the OR subcircuits, the phrase inputs are coupled to a phrase input signal and the convoluted data outputs are coupled to corresponding convoluted data output signals wherein the XOR subcircuits are configured so that the phrase is received by each of the XOR subcircuits on a corresponding phrase input;
  wherein responsive to receiving a predetermined value of the select signal on the control input each OR subcircuit is configured to forward the portion of the digital data received on the input data signals to a corresponding XOR subcircuit on a selected data output;
  wherein the XOR subcircuit is configured to perform one or more XOR operations to combine a corresponding sub-phrase from the phrase with each portion of the digital data received from the OR subcircuits to convolute the digital data; and
  wherein the XOR circuit is configured to output the convoluted digital data on a corresponding convoluted data output.

* * * * *